US006454883B1

(12) United States Patent
Rückert

(10) Patent No.: US 6,454,883 B1
(45) Date of Patent: Sep. 24, 2002

(54) STEERING WHEEL SKELETON

(75) Inventor: Franz Rückert, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/457,975

(22) Filed: Dec. 9, 1999

(30) Foreign Application Priority Data

Dec. 10, 1998 (DE) ......................................... 198 56 940

(51) Int. Cl.$^7$ ............................. B62D 1/04; C22F 1/047
(52) U.S. Cl. ........................ 148/440; 148/702; 74/552
(58) Field of Search .......................... 428/579; 148/415, 148/440, 688, 702; 74/552

(56) References Cited

U.S. PATENT DOCUMENTS

| 5,070,742 A | * | 12/1991 | Sakane ........................ 74/552 |
| 5,085,097 A | * | 2/1992 | Harata et al. ................. 74/552 |
| 5,097,720 A | * | 3/1992 | Drefahl ........................ 74/552 |
| 5,573,606 A | * | 11/1996 | Evans et al. ................. 148/440 |
| 5,925,314 A | * | 7/1999 | Nishiguchi et al. ......... 420/528 |

FOREIGN PATENT DOCUMENTS

| DE | 36 33 338 | 4/1988 |
| DE | 37 17 002 | 12/1988 |
| DE | 38 27 794 | 3/1989 |
| DE | 39 26 576 | 2/1991 |
| EP | 0292038 | * 11/1988 |
| EP | 0 412 605 | 2/1991 |

* cited by examiner

Primary Examiner—John J. Zimmerman
(74) Attorney, Agent, or Firm—Kenyon & Kenyon

(57) ABSTRACT

A one-piece steering wheel skeleton is produced by die casting an aluminum alloy of the Al—Mg—Mn type. Such a steering wheel skeleton has a high strength in combination with a high ductility. An object is to further increase the ductility of such a steering wheel skeleton, so that severe deformation of the steering wheel skeleton without breakage of the steering wheel spokes occurs under the influence of a very high acting force. To achieve this, the steering wheel skeleton undergoes a heat treatment in age hardening at elevated temperatures and then is cooled in stationary air. A steering wheel skeleton heat treated in this way can endure at least 30% greater deformation without breakage of the spokes in comparison with an untreated workpiece.

17 Claims, 5 Drawing Sheets

STEERING WHEEL SKELETON

FIELD OF THE INVENTION

The present invention is based on a steering wheel skeleton, which is produced in one piece from an aluminum alloy of the Al—Mg—Mn type by die casting.

BACKGROUND INFORMATION

European Patent No. 412 605 describes a steering wheel skeleton, where the steering wheel hub, steering wheel spokes and the encapsulation of the steering wheel spokes on the steering wheel rim are die cast in one piece from an aluminum alloy. The proposed materials for use here are hardenable aluminum alloys of the AlSi7Mg, AlSi9Mg or AlSi10Mg type enriched with antimony or strontium. To increase its elongation at break, the steering wheel skeleton is subjected to a conventional hardening treatment, i.e., a heat treatment in the form of solution annealing, quenching and subsequent elevated-temperature age hardening.

It is also known from European Patent No. 412 605 that the heat treatment described above can be omitted if an aluminum alloy of the Al—Mg—Mn type is used instead of the above-mentioned Al—Si—Mg alloys as the material for die casting the steering wheel skeleton. Steering wheel skeletons of Al—Mg—Mn alloys even in the cast state should have the mechanical properties, in particular a high elongation at break, that are most important for operating reliability and accident safety, with a suitable deformation stress even under accident conditions.

However, starting from these casting materials, there is still a need for a further increase in ductility of the steering wheel skeleton for safety steering wheels under accident conditions in order to be able to ensure even greater deformation of the steering wheel skeleton without breakage of the steering wheel spokes. This concerns in particular use in steering wheel designs where the steering wheel rim is greatly offset axially with respect to the steering wheel hub, and the steering wheel spokes may be subject to severe compression under accident conditions. In addition, this concerns in particular steering wheel skeletons where the hub, spokes and steering wheel rim may be cast in one piece to reduce the weak points within the skeleton and for technical manufacturing reasons, and therefore they are made of the same material, which is why especially high demands are made of this material with regard to strength and workability.

SUMMARY OF THE INVENTION

Therefore, an object of the present invention is to further improve upon one-piece die-cast steering wheel skeletons made of aluminum alloys of the Al—Mg—Mn type by increasing their ductility, so that the steering wheel skeleton will preferably undergo only compression but no breakage even under a high acting force.

Then the cast steering wheel skeleton made of an aluminum alloy of the Al—Mg—Mn group is subjected as a whole to a heat treatment, preferably by first heating the steering wheel skeleton to a temperature between 250° C. and 400° C. This heating corresponds to an averaging treatment to achieve an equilibrium of the hardenable elements. The heating time is preferably between one hour and four hours. Then the steering wheel skeleton is cooled in stationary air.

The steering wheel skeletons heat treated in this way have a greatly increased ductility. The compression length by which a heat-treated steering wheel skeleton can be deformed under the influence of a static pressure without breakage of the spokes is almost twice as great as the compression length of the untreated steering wheel skeleton in the cast state. Thus, a very high compression of the steering wheel spokes without breakage can be achieved even with steering wheel designs where the steering wheel rim is offset axially to a great extent with respect to the steering wheel hub.

Heating of the steering wheel skeleton as a whole and cooling in stationary air guarantee that there is only negligible thermal deformation in comparison with the cast state due to the heat treatment in the steering wheel skeleton. These heat-treated steering wheel skeletons can therefore be processed further without any post-straightening despite the high accuracy demands made of them.

DETAILED DESCRIPTION

Figure 1:
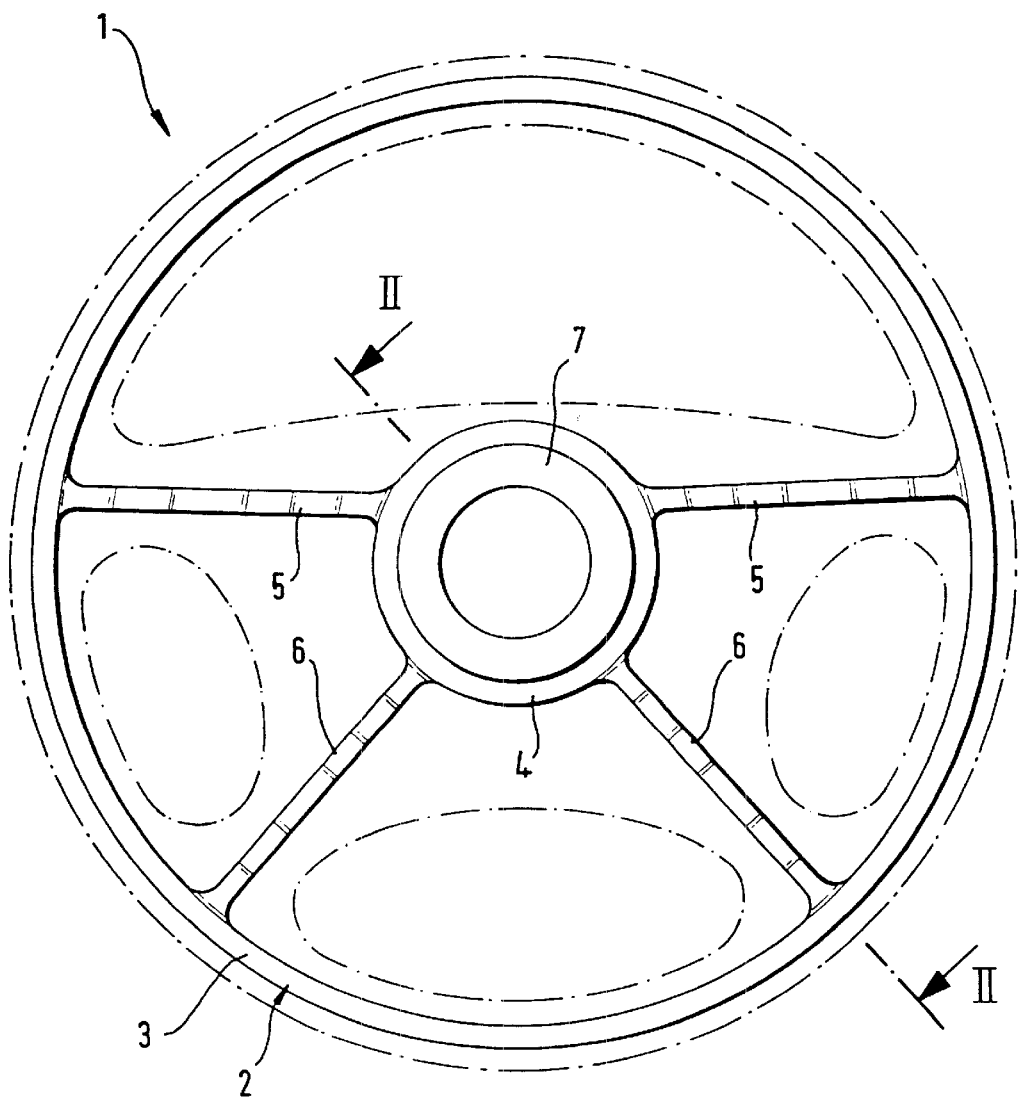
FIG. 1 shows a view of a steering wheel.
Figure 2:
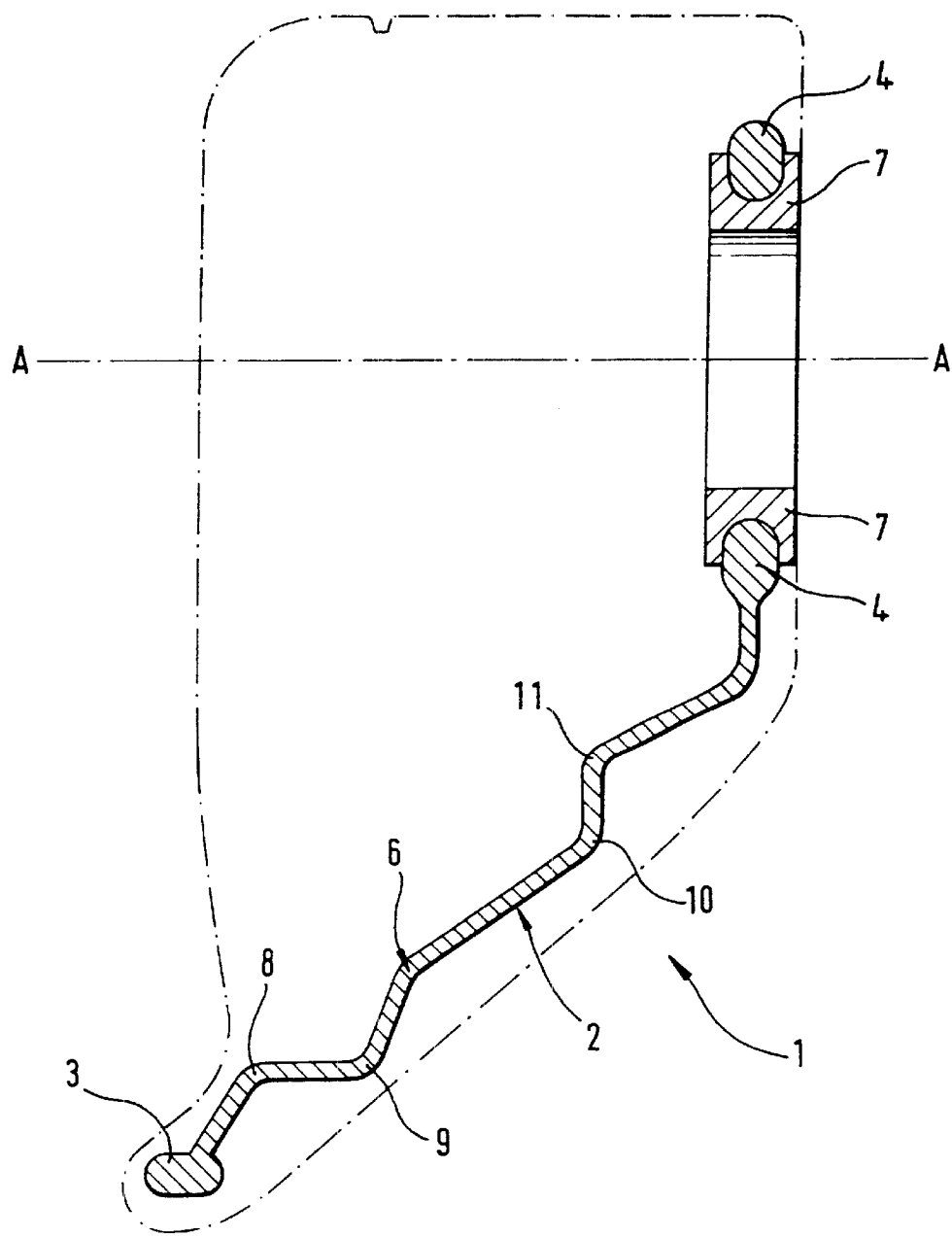
FIG. 2 shows a section 11—11 through the steering wheel from FIG. 1.

FIG. 1 shows a steering wheel 1 with a steering wheel skeleton 2 embedded in it. Steering wheel skeleton 2, which is produced in one piece by die casting, includes a steering wheel rim 3 attached by four steering wheel spokes 5, 6 to a steering wheel hub 4. A steel core 7 is integrally cast into the steering wheel hub. Steering wheel rim 3 and steering wheel hub 4 extend in a plane normal to axis A of rotation of steering wheel 1 and are offset axially from one another, as shown in FIG. 2, so that steering wheel skeleton 1 is bowl shaped.

Axis A of rotation of steering wheel 1 runs at an angle of approximately 25 degrees to a vertical transverse plane of the vehicle. In a front collision of the vehicle with an obstacle, the driver's body can strike the side of steering wheel 1 facing the driver. To facilitate a controlled deformation of the steering wheel under the forces acting on it, spokes 5, 6 have a plurality of rounded bends 8–11. In addition, a material having a high strength but enough ductility for the steering wheel to bend without breaking under the acting force must be used to manufacture the steering wheel skeleton. It has proven especially advantageous for the material for casting the steering wheel skeleton to be an Al—Mg—Mn alloy which has a greater ductility than other comparable light construction materials even in the cast state.

The aluminum alloy may, for example, have the following composition:

- 1.8–2.3 percent by weight magnesium,
- 0.6–0.8 percent by weight iron,
- 0.4–0.6 percent by weight manganese,
- 0.2–0.4 percent by weight silicon,
- 0.15–0.2 percent by weight zirconium, additional elements <0.05 percent by weight each, and a remainder is aluminum.

To further increase the ductility of the steering wheel skeleton produced from an Al—Mg—Mn alloy, the cast part is subjected to a heat treatment according to the present invention by heating the steering wheel skeleton as a whole to temperatures between 280° C. and 400° C. in a furnace. This corresponds to age hardening at an elevated-temperature, which yields homogenization of the alloy and an equilibrium setting of the hardenable elements. Heating time here should be between one hour and four hours. A heat treatment for approximately two hours at 370–390° C. has proven best. Then the steering wheel skeleton is cooled in stationary air. The result is very little heat deformation of the steering wheel skeleton, which is subject to high geometric accuracy requirements, thus eliminating the need for expensive reworking of the steering wheel skeleton.

Figure 3:
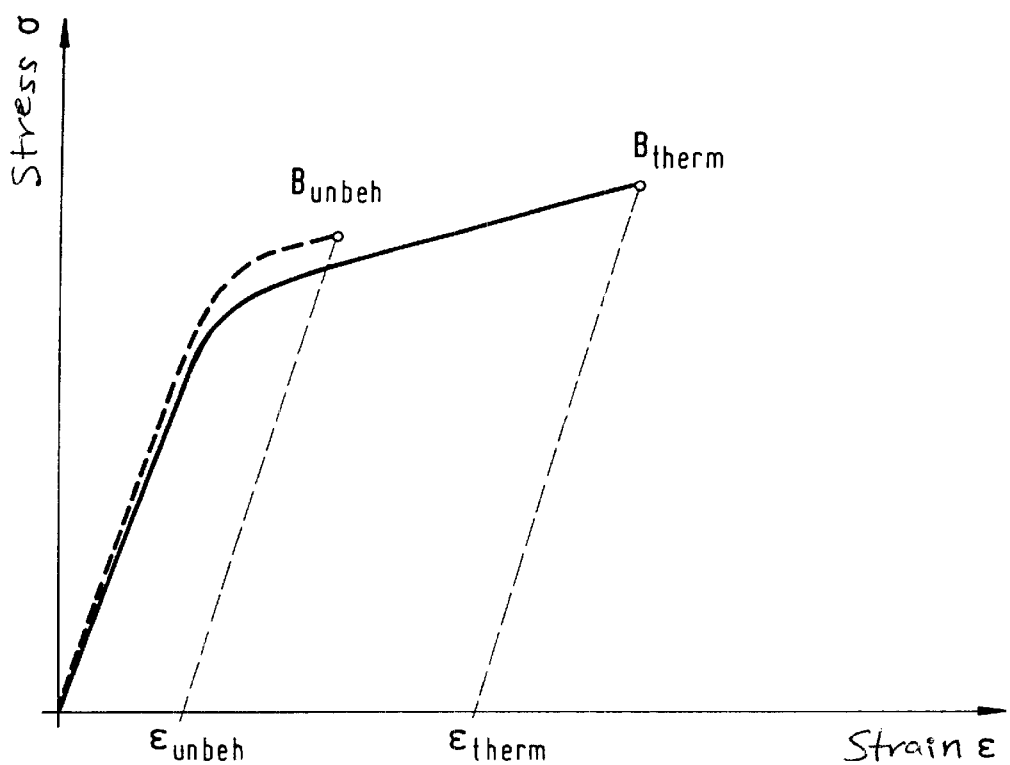
FIG. 3 shows a schematic diagram of a stress-strain diagram of an Al—Mg—Mn workpiece in the cast state and after heat treatment.

To test the bending and breaking behavior of the Al—Mg—Mn alloy, tension tests were performed on heat-treated and untreated material specimens. FIG. 3 shows a schematic diagram of the measured stress-strain diagrams. The characteristic line of an Al—Mg—Mn test object in the cast state, i.e., without heat treatment, shows that the workpiece is first subject to elastic strain under the acting force and develops cracks or breaks at a higher tensile force after a slight inelastic deformation phase. The breaking point of the untreated material is shown as $B_{unbeh}$ in the diagram in FIG. 4, and the maximum strain length is $\epsilon_{unbeh}$. The characteristic line of the heat-treated test object has a similar elastic strain characteristic; however, this is followed by a significantly broader inelastic deformation range ending at breaking point $B_{therm}$ in comparison with the untreated cast state. A strain length $\epsilon_{therm}$ three times greater than maximum strain length $\epsilon_{unbeh}$ in the cast state can be achieved with the heat-treated test object.

Figure 4:
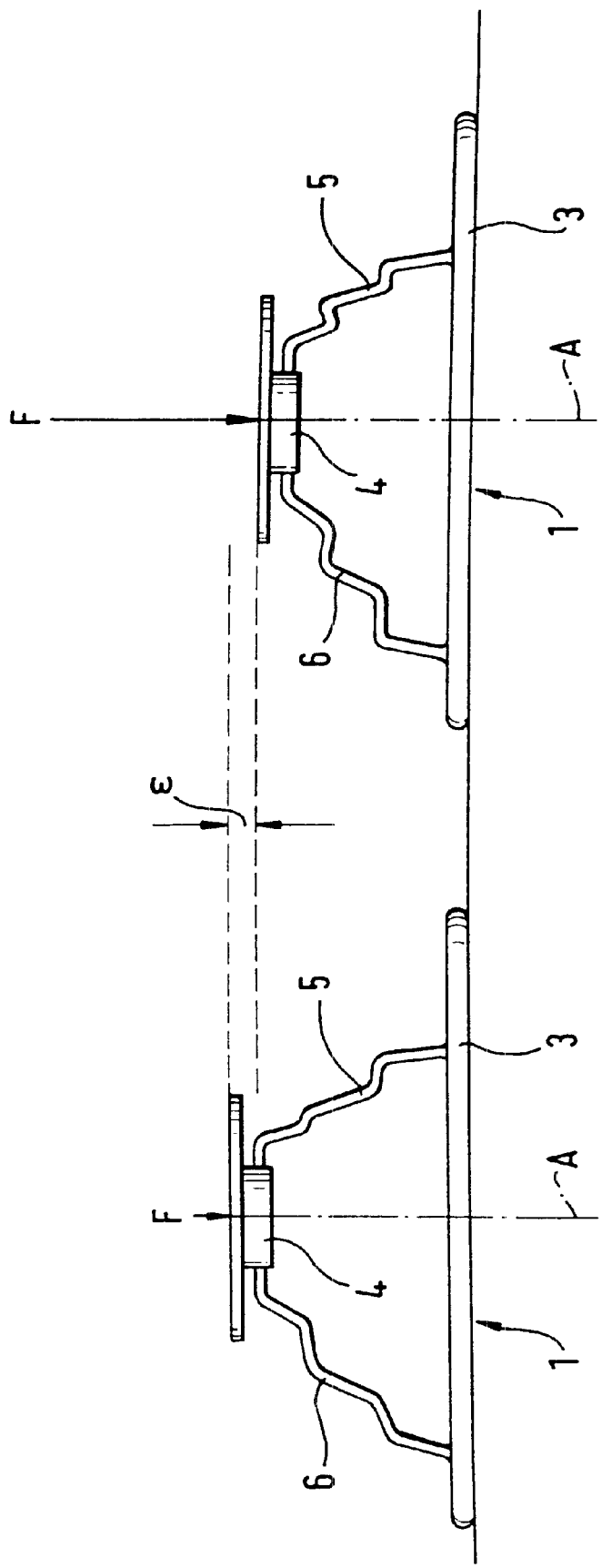
FIG. 4 shows a schematic diagram of an experimental setup for pressure tests on steering wheel skeletons.
Figure 5:
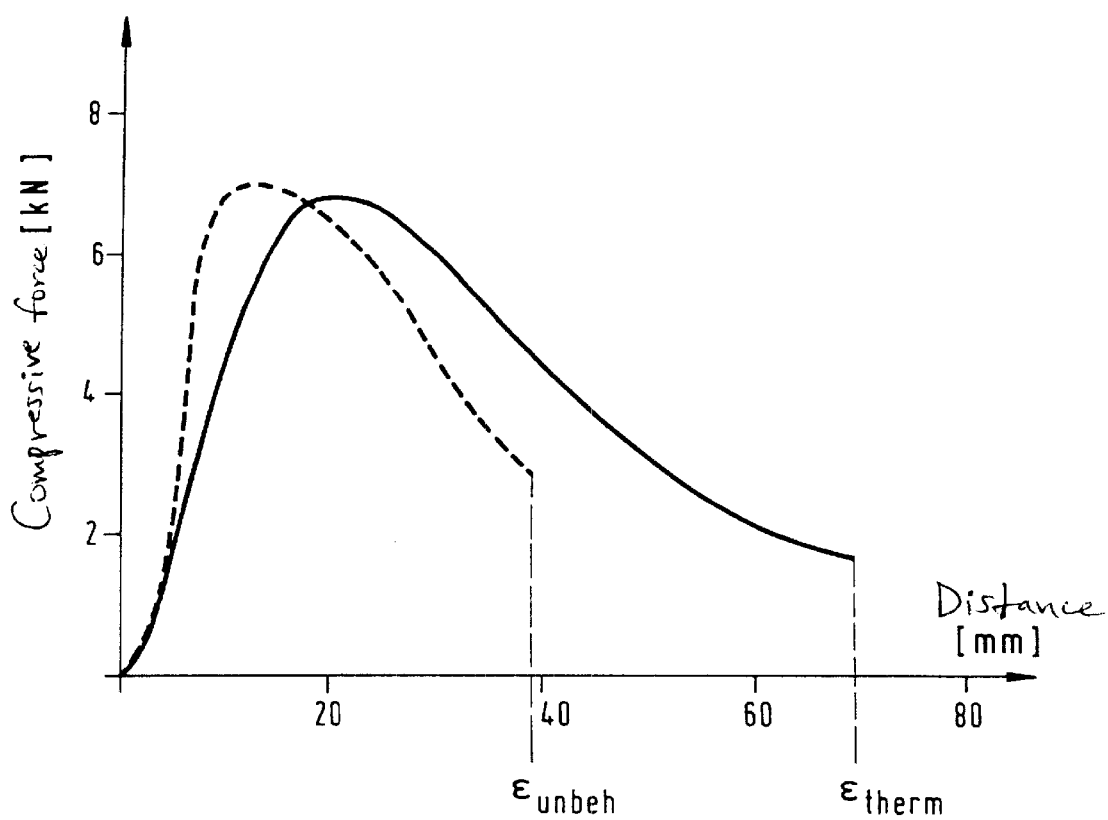
FIG. 5 shows a force-distance diagram of pressure tests on Al—Mg—Mn steering wheel skeletons in the cast state and after heat treatment.

In addition, static pressure tests were performed on complete skeletons in the cast state and in the heat-treated state. FIG. 4 shows a schematic diagram of the testing set-up. A central static compressive force F is exerted on hub 4 of steering wheel skeleton 1 parallel to axis A of rotation, with steering wheel rim 3 sitting on a hard, smooth surface. Compressive force F thus leads to compression $\epsilon$ of spokes 5, 6. FIG. 5 shows a plot of the force-distance diagrams measured in this experimental set-up. A steering wheel skeleton 1 in the cast state can be deformed by a maximum compression $\epsilon_{unbeh}$ of approximately 40 mm before breaking and cracking of spokes 5, 6. The deformability of steering wheel skeleton I is increased by the heat treatment, so that annealed steering wheel skeleton 1 can be compressed by a maximum compression $\epsilon_{therm}$ of more than 70 mm without any cracking or breaking of spokes 5, 6.

What is claimed is:

1. A steering wheel skeleton comprising:
   a steering wheel rim;
   a steering wheel hub; and
   steering wheel spokes,
   wherein the steering wheel rim, hub and spokes are formed by die casting in one piece from an aluminum alloy of Al—Mg—Mn, and
   wherein the steering wheel rim, hub and spokes are heat treated to increase ductility.

2. The steering wheel skeleton according to claim 1, wherein the aluminum alloy is an Al—Mg—Mn alloy and has the following composition:
   1.8–2.3 percent by weight magnesium,
   0.6–0.8 percent by weight iron,
   0.4–0.6 percent by weight manganese,
   0.2–0.4 percent by weight silicon,
   0.15–0.2 percent by weight zirconium,
   additional elements <0.05 percent by weight each, and
   a remainder is aluminum.

3. A method of producing a steering wheel skeleton having a steering wheel rim, a steering wheel hub and steering wheel spokes and produced by die casting in one piece from an aluminum alloy of Al—Mg—Mn, comprising the steps of:
   producing a blank of the steering wheel skeleton by die casting; and
   after the producing step, subjecting the blank of the steering wheel skeleton to a heat treatment as a whole to increase ductility thereof.

4. The method according to claim 3, further comprising the steps of exposing the steering wheel skeleton to an elevated temperature in a wake of the heat treatment, and then cooling the steering wheel skeleton in stationary air.

5. The method according to claim 4, wherein the steering wheel skeleton is exposed to the elevated temperature for an interval of one to four hours.

6. The method according to claim 4, wherein the steering wheel skeleton is exposed to the elevated temperature for about two hours.

7. A method of producing a steering wheel skeleton having a steering wheel rim, a steering wheel hub and steering wheel spokes and produced by die casting in one piece from an aluminum alloy of Al—Mg—Mn, comprising the steps of:
   producing a blank of the steering wheel skeleton by die casting;
   after the producing step, subjecting the blank of the steering wheel skeleton to a heat treatment as a whole to increase ductility thereof; and
   exposing the steering wheel skeleton to an elevated temperature in a wake of the heat treatment, and then cooling the steering wheel skeleton in stationary air,
   wherein the steering wheel skeleton is heat treated at temperatures between 250° C. and 400° C.

8. A method of producing a steering wheel skeleton having a steering wheel rim, a steering wheel hub and steering wheel spokes and produced by die casting in one piece from an aluminum alloy of Al—Mg—Mn, comprising the steps of:
   producing a blank of the steering wheel skeleton by die casting;
   after the producing step, subjecting the blank of the steering wheel skeleton to a heat treatment as a whole to increase ductility thereof; and
   exposing the steering wheel skeleton to an elevated temperature in a wake of the heat treatment, and then cooling the steering wheel skeleton in stationary air,
   wherein the steering wheel skeleton is heat treated at temperatures between 370° C. and 390° C.

9. A method of producing a steering wheel skeleton having a steering wheel rim, a steering wheel hub and steering wheel spokes and produced by die casting in one piece from an aluminum alloy of Al—Mg—Mn, comprising the steps of:
   producing a blank of the steering wheel skeleton by die casting; and
   after the producing step, subjecting the blank of the steering wheel skeleton to a heat treatment as a whole to increase ductility thereof,
   wherein the steering wheel skeleton is heat treated at temperatures between 250° C. and 400° C. for an interval of one to four hours.

10. The method according to claim 9, wherein the steering wheel skeleton is heat treated at temperatures between 370° C. and 390° C.

11. The method according to claim 9, wherein the interval is about two hours.

12. A method for forming a steering wheel skeleton formed of an aluminum alloy of an Al—Mg—Mn alloy having the following composition:

- 1.8–2.3 percent by weight magnesium,
- 0.6–0.8 percent by weight iron,
- 0.4–0.6 percent by weight manganese,
- 0.2–0.4 percent by weight silicon,
- 0.15–0.2 percent by weight zirconium,
- additional elements <0.05 percent by weight each, and
- a remainder is aluminum, the method comprising the step of:
  - heat treating the steering wheel skeleton at temperatures between 250° C. and 400° C. for an interval of one to four hours.

13. The method according to claim 12, wherein the steering wheel skeleton is heat treated at temperatures between 370° C. and 390° C.

14. The method according to claim 12, wherein the interval is about two hours.

15. A steering wheel skeleton comprising:

a steering wheel rim;

a steering wheel hub; and steering wheel spokes, wherein the steering wheel rim, hub and spokes are formed by die casting in one piece from an aluminum alloy, and wherein the aluminum alloy is an Al—Mg—Mn alloy and has the following composition:

- 1.8–2.3 percent by weight magnesium,
- 0.6–0.8 percent by weight iron,
- 0.4–0.6 percent by weight manganese,
- 0.2–0.4 percent by weight silicon,
- 0.15–0.2 percent by weight zirconium,
- additional elements <0.05 percent by weight each, and
- a remainder is aluminum;
- the steering wheel skeleton being formed according to a method that includes the step of:
  - heat treating the steering wheel skeleton at temperatures between 250° C. and 400° C. for an interval of one to four hours.

16. The steering wheel skeleton according to claim 15, wherein the steering wheel skeleton is heat treated at temperatures between 370° C. and 390° C.

17. The steering wheel skeleton according to claim 15, wherein the interval is about two hours.

* * * * *